(12) United States Patent
Garnaud et al.

(10) Patent No.: US 11,851,201 B2
(45) Date of Patent: Dec. 26, 2023

(54) TURBOMACHINE COMPRISING A MEANS OF SUSPENSION

(71) Applicant: SAFRAN AIRCRAFT ENGINES, Paris (FR)

(72) Inventors: Quentin Matthias Emmanuel Garnaud, Moissy-Cramayel (FR); Guillaume Glemarec, Moissy-Cramayel (FR); Hervé Jean Albert Mouton, Moissy-Cramayel (FR); Guilhem Seize, Moissy-Cramayel (FR); Benoit Bernard René Leclerc, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 470 days.

(21) Appl. No.: 17/283,742

(22) PCT Filed: Oct. 4, 2019

(86) PCT No.: PCT/FR2019/052354
§ 371 (c)(1),
(2) Date: Apr. 8, 2021

(87) PCT Pub. No.: WO2020/074810
PCT Pub. Date: Apr. 16, 2020

(65) Prior Publication Data
US 2021/0323690 A1    Oct. 21, 2021

(30) Foreign Application Priority Data

Oct. 8, 2018  (FR) ..................................... 1859309

(51) Int. Cl.
*B64D 27/26*    (2006.01)
*B64D 27/16*    (2006.01)

(52) U.S. Cl.
CPC ............. *B64D 27/26* (2013.01); *B64D 27/16* (2013.01); *B64D 2027/262* (2013.01)

(58) Field of Classification Search
CPC .................... B64D 2027/268; B64D 2027/262
(Continued)

(56) References Cited

U.S. PATENT DOCUMENTS 9,321,537 B2 *   4/2016   Dunleavy .............. B64D 27/26
10,295,970 B2 *   5/2019   Lliopoulos ................ B64F 5/10
(Continued)

FOREIGN PATENT DOCUMENTS

EP    2572986 A2 *   3/2013   ............. B64D 27/26
FR    2 867 155        9/2005
(Continued)

OTHER PUBLICATIONS

International Patent Application No. PCT/FR2019/052354, International Search Report and Written Opinion dated Jan. 8, 2020, 17 pgs.

*Primary Examiner* — Christopher P Ellis
(74) *Attorney, Agent, or Firm* — Cozen O'Connor

(57) ABSTRACT

The invention relates to a turbomachine (1) extending along an axis (X), comprising a high-pressure body with a high-pressure compressor (4) coupled in rotation to a high-pressure turbine (6), and a low-pressure body including a low-pressure compressor (3) coupled in rotation to a low-pressure turbine (7), an upstream casing (14) located upstream of the high-pressure compressor (4), and means of suspension (12, 13) for the turbomachine (1), intended for attaching the turbomachine (1) to an aircraft pylon (11).

20 Claims, 2 Drawing Sheets

(58) Field of Classification Search
USPC .......................................................... 244/54
See application file for complete search history.

(56) References Cited

U.S. PATENT DOCUMENTS

| | | | | |
|---|---|---|---|---|
| 11,679,886 | B2* | 6/2023 | Berjot | B64D 27/26 244/54 |
| 11,708,169 | B2* | 7/2023 | West | B64D 27/26 244/54 |
| 2004/0251381 | A1* | 12/2004 | Pasquer | B64D 27/26 244/54 |
| 2012/0056033 | A1* | 3/2012 | Teulou | B64D 27/26 244/54 |
| 2019/0352013 | A1* | 11/2019 | Whiteford | B64D 27/26 |
| 2022/0274712 | A1* | 9/2022 | West | B64D 27/18 |
| 2023/0030853 | A1* | 2/2023 | Messina | F02C 7/20 |

FOREIGN PATENT DOCUMENTS

| | | | | |
|---|---|---|---|---|
| FR | 2 892 706 | A1 | 5/2007 | |
| FR | 2 963 320 | A1 | 2/2012 | |
| FR | 3013077 | A1 * | 5/2015 | ............ F01D 25/04 |
| WO | WO 2013/050715 | A1 | 4/2013 | |

* cited by examiner

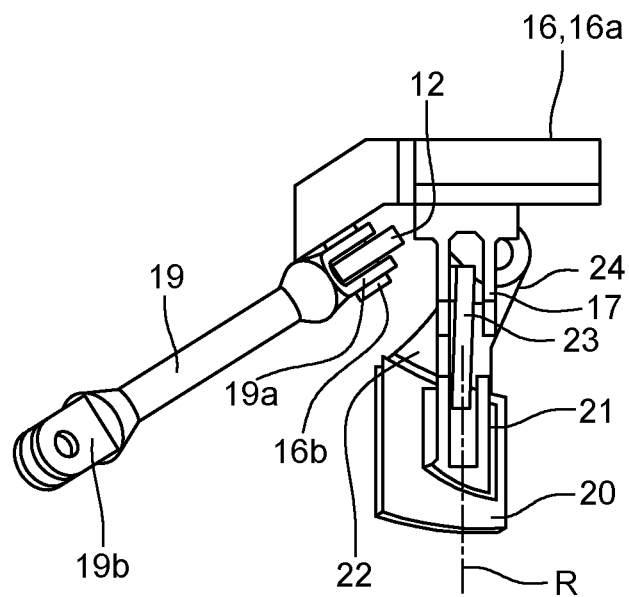
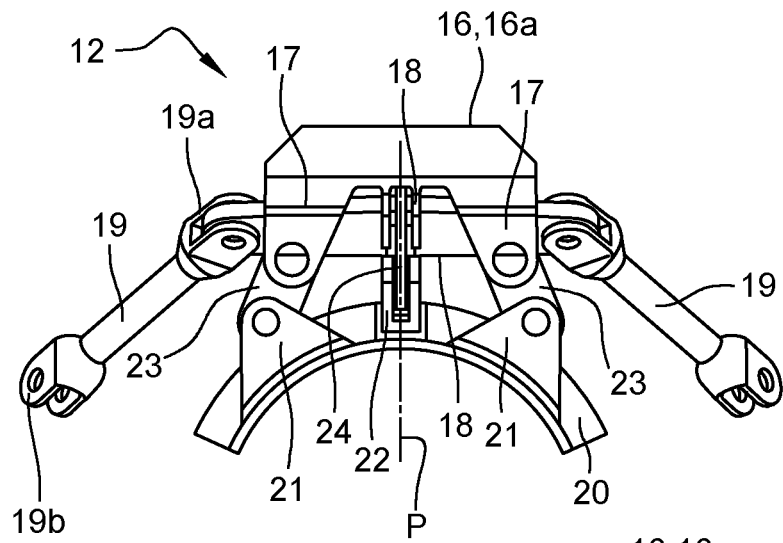
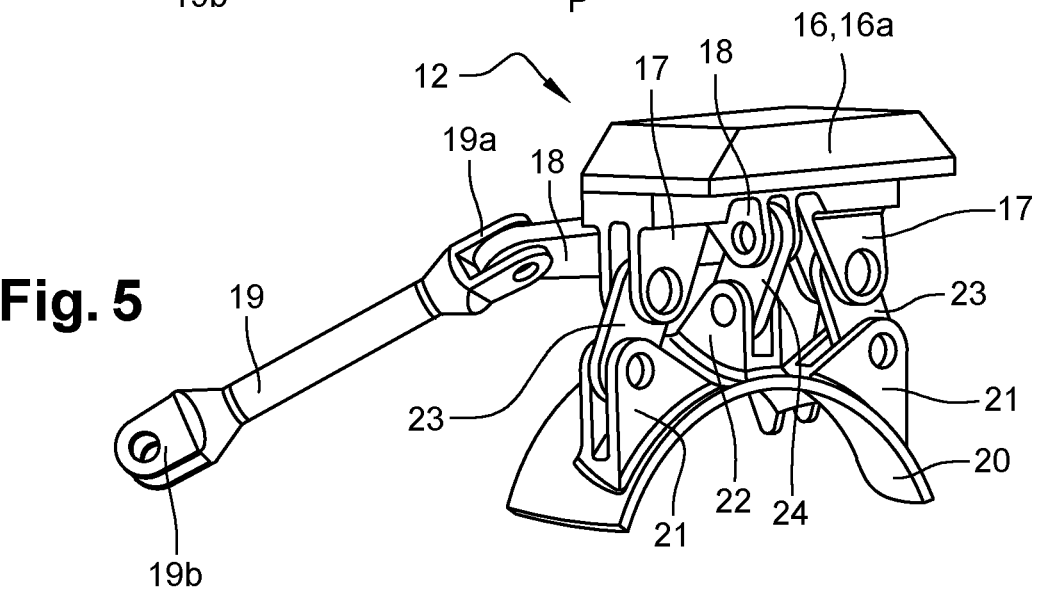

TURBOMACHINE COMPRISING A MEANS OF SUSPENSION

CROSS-REFERENCE TO RELATED APPLICATIONS

This application is a 35 U.S.C. § 371 filing of International Application No. PCT/FR2019/052354 filed Oct. 4, 2019, which claims the benefit of priority to French Patent Application No. 1859309 filed Oct. 8, 2018, each of which is incorporated herein by reference in its entirety.

FIELD OF THE INVENTION

The present invention concerns a suspension system for a turbomachine, in particular for a double-flow turbojet.

BACKGROUND OF THE INVENTION

A double-flow turbojet conventionally comprises a flow vein of a primary flow or primary vein with, from upstream to downstream in the direction of flow of the gas within the turbomachine, a low-pressure compressor, a high-pressure compressor, a combustion chamber, a high-pressure turbine and a low-pressure turbine. The turbojet also comprises a flow vein of a secondary flow or secondary vein, located radially outside the primary vein. The terms 'radial', 'axial' and 'circumferential' are defined with respect to the axis of the turbomachine. The terms 'upstream' and 'downstream' are defined with respect to the gas flow through the turbomachine.

The turbojet is usually attached to a pylon or mast of an aircraft, the pylon itself being attached to the aircraft structure, such as the wing. The pylon allows the forces generated by the turbojet to be transmitted to the aircraft structure and also allows the routing of fuel, air, electrical and hydraulic systems between the turbojet and the aircraft.

Patent application FR 2 867 155 on behalf of the Applicant discloses a turbomachine attached to a pylon by means of a suspension system comprising an upstream suspension system and a downstream suspension system. The upstream suspension system is attached to an intermediate casing integral with a fan casing, the downstream suspension system being attached to an exhaust casing. Both casings are structural elements of the turbomachine.

The function of a suspension system is to ensure the transmission of mechanical forces between the turbomachine and the pylon. These forces are in particular the thrust generated by the turbomachine, oriented along the axis of the turbomachine noted X, the lateral aerodynamic loads, oriented along an axis noted Y and the weight of the turbomachine, oriented vertically along an axis noted Z. The function of the suspension system is also to take up the engine torque, called Mx, which is exerted on the turbomachine in a circumferential direction around the X axis. The X, Y and Z axes are orthogonal in pairs.

In the following description, particular attention will be paid to the upstream suspension system.

A known upstream suspension system known as a "core" type suspension system conventionally comprises a beam intended to be attached to an aircraft pylon, a cylindrical part integral with the beam and articulated on a ball joint casing, the ball joint casing comprising a body and a ball joint nut articulated on the body, the cylindrical part being mounted so as to pivot about its axis in the ball joint nut. The body of the ball joint casing is attached to a fixed part of the turbojet, for example, in a twin-body, double-flow turbojet, to an intermediate casing or to an inter-compressor casing located between the low-pressure compressor and the high-pressure compressor.

There is currently a need to increase the dilution ratio of the turbojets. Remember that the dilution ratio is the ratio of the secondary flow rate to the primary flow rate. In order to increase the dilution rate, it is therefore necessary to increase the cross section of the air passage in the secondary vein. To achieve this, the aim is to reduce the radial space occupied by the inter-vein compartment, also called the "core zone", located between the primary vein and the secondary vein. For this purpose, it can be useful to reduce the dimensions of the upstream suspension system, especially in the area where it is attached to the corresponding casing in the area of the turbomachine.

SUMMARY OF THE INVENTION

The invention aims to remedy these various constraints in a simple, reliable and inexpensive way.

For this purpose, the invention relates to a turbomachine extending along an axis, with a high-pressure body including a high-pressure compressor rotationally coupled to a high-pressure turbine, and a low-pressure body including a low-pressure compressor rotationally coupled to a low-pressure turbine, an upstream casing located upstream of the high-pressure compressor, and means for suspending the turbomachine, intended for attaching the turbomachine to an aircraft pylon, the said means of suspension comprising an upstream suspension system with a beam intended to be attached to the pylon, at least two connecting rods circumferentially spaced apart from each other and each articulated at a first end to the beam and at a second end to the upstream casing, a rudder bar articulated to the beam at a circumferentially central zone of said rudder bar, at least two force-recovery rods spaced apart circumferentially from each other and each articulated at a first end to the rudder bar and at a second end to a fixed part of the turbomachine, said at least two force-recovery rods being located upstream of a radial suspension plane defined by two connecting rods, the means of suspension further comprising a downstream suspension system capable of connecting the pylon to a fixed downstream casing of the turbomachine.

It should be remembered that the terms 'upstream' and 'downstream' are defined in relation to the direction of gas flow within the turbomachine and that the terms 'axial', 'radial' and 'circumferential' are defined with respect to the axis of the turbomachine.

Such a structure makes it possible to reduce the size of the means of suspension, in particular the upstream suspension system, so as to be able to increase the cross section of the secondary vein and thus the dilution rate of the turbomachine.

The turbomachine can be a turbojet, in particular a double-flow turbojet. The turbojet can be a non-ducted engine, for example of the so-called "open rotor" type.

The upstream casing can be an inter-compressor casing, located axially between the high-pressure compressor and the low-pressure compressor.

Alternatively, the inlet casing can be an intermediate casing, located radially between a radially inner primary flow vein and a radially outer secondary flow vein of the turbomachine.

A first connecting rod and a second connecting rod of said connecting rods can extend in a radial plane of the turbomachine, the first end and the second end of each of the first and second connecting rods being articulated about articulation axes parallel to the axis of the turbomachine.

The first and second connecting rods are thus able to take up radial forces.

One of the connecting rods can have a general L shape and can be configured to take up torque around the axis of the turbomachine.

The upstream suspension system of the means of suspension can comprise a third connecting rod articulated at a first end to the beam and articulated at a second end to the upstream casing, a functional clearance being provided on at least one articulation of the third connecting rod to the beam and/or to the upstream casing in such a way that the third connecting rod is not solicited in normal operation and is solicited in the event of rupture of one of the first and second connecting rods.

The third connecting rod can be configured to implement a Fail Safe function.

The third connecting rod can extend in an axial plane and is articulated at its first end and at its second end about articulation axes perpendicular to the axis of the turbomachine.

The third connecting rod can be located circumferentially between the first and second connecting rods.

The second ends of the connecting rods can be articulated on a mounting plate attached to the upstream casing.

The fixed part of the turbomachine can be an intermediate casing, and the second end of each force-recovery rod can be articulated on a flange of the intermediate casing, the said flange being located radially between a primary flow vein and a secondary flow vein of the turbomachine.

Such a turbomachine is for example a double-flow turbojet.

The force-recovery rods can extend in a plane at an angle to the radial plane.

The force-recovery rods can be oriented so that they move away from each other in the circumferential direction upstream.

The first ends of the force-recovery rods can be articulated to the circumferential ends of the rudder bar.

The articulations of the rods can be made by means of clevises formed on the said rods or on the elements on which they are articulated.

One of the connecting rods can have an L-shape suitable for taking up the torque forces Mx acting on the turbomachine in a circumferential direction around the X axis.

The turbomachine can comprise a transmission reducer between a shaft of the low-pressure body and a fan located upstream of the intermediate casing, characterised in that the articulations of the force-recovery rods on the intermediate casing are located in a radial plane traversed by a downstream part of the reducer.

The connecting rods can be articulated in devises in the beam and the intermediate casing or in the plate attached to the intermediate casing.

The ends of the force-recovery rods can have clevises engaged in additional parts of the fixed part of the turbomachine, for example the intermediate casing, and on additional parts of the rudder bar.

The downstream part of the means of suspension can comprise two connecting rods spaced circumferentially apart and capable of taking up forces directed in the radial plane.

The connecting rods of the downstream part can extend in a radial plane, the axes of articulation of the said connecting rods being parallel to the axis of the turbomachine.

Each connecting rod of the downstream part can be articulated, at a first end, on a downstream suspension beam, attached to the pylon, and at a second end, on an exhaust casing of the turbomachine.

The invention will be better understood and other details, characteristics and advantages of the invention will appear when reading the following description, which is given as a non-limiting example, with reference to the attached drawings.

BRIEF DESCRIPTION OF THE FIGURES

FIGS. 3 to 5 are side, front and perspective views of the upstream suspension system of the means of suspension.

DETAILED DESCRIPTION

Figure 1:
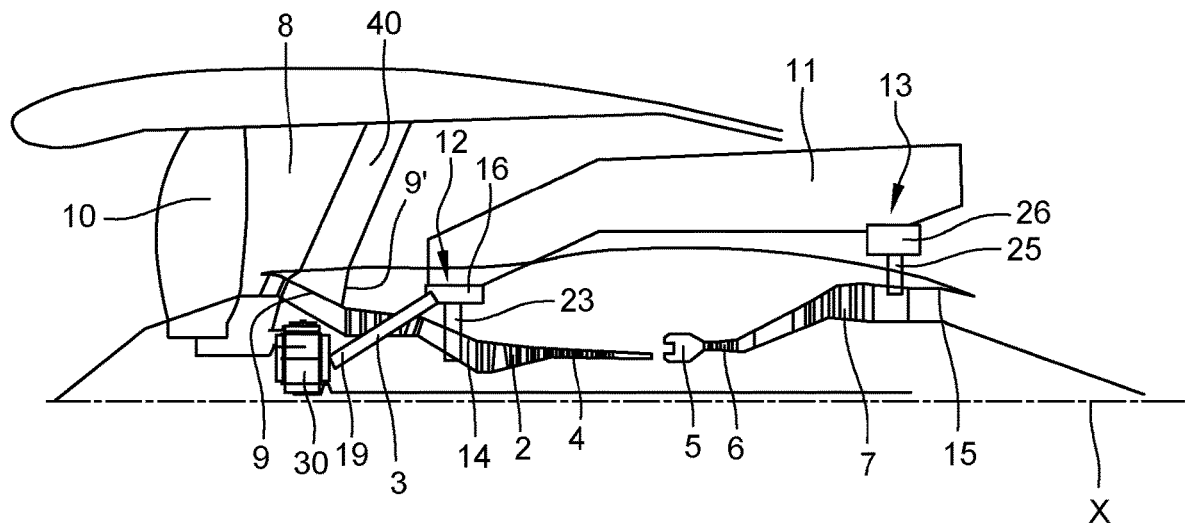
FIG. 1 is an axial sectional view of a portion of a double-flow turbojet according to one embodiment of the invention.

FIG. 1 shows a double-flow turbojet 1 according to an embodiment of the invention. This extends along an X-axis. In the following description, the terms 'axial' and 'radial' are defined with respect to the X axis. The turbojet 1 comprises a flow vein of a primary flow or primary vein 2 with, from upstream to downstream in the direction of flow of the gas within the turbomachine, a low-pressure compressor 3, a high-pressure compressor 4, a combustion chamber 5, a high-pressure turbine 6 and a low-pressure turbine 7. The turbojet 1 also comprises a flow vein of a secondary flow or secondary vein 8, located radially outside the primary vein 2. An intermediate casing (9) comprising at least one structural shell located radially between the primary and secondary veins, and a plurality of flow-deflection blades (40) arranged in the secondary vein and integral with the structural shell. A fan 10 is located upstream of the intermediate casing.

The terms 'upstream' and 'downstream' are defined with respect to the gas flows within the turbojet 1.

The turbojet 1 is attached to a pylon (or mast) 11 of an aircraft, which in turn is attached to the structure of the aircraft, such as the wing. The pylon is used to transmit the forces generated by the turbojet 1 to the aircraft structure and also allows the routing of fuel, air, electrical and hydraulic systems between the turbojet 1 and the aircraft.

In particular, the turbojet 1 is attached to the pylon via an upstream suspension system 12 and a downstream suspension system.

The upstream suspension system 12 is attached to an inter-compressor casing 14. The inter-compressor casing 14 is located axially between the high pressure compressor 2 and the low pressure compressor 3. The presence of an inter-compressor casing is particularly advantageous in a turbojet fitted with a reducer that allows the fan speed to be reduced in relation to that of the low-pressure casing. Indeed, the inter-compressor casing can be used to support the reducer in the turbomachine, for example to provide downstream support for the reducer while upstream support for the reducer is provided by the intermediate casing. In the embodiment shown in FIG. 1, a reducer 30 is arranged radially inside an inner shell of the intermediate casing 9, the said inner shell delimiting the primary vein inside. The downstream suspension system 13 is attached to an exhaust casing 15.

The dilution ratio of the turbojet 1 is relatively high, for example between 10 and 20. The cross-section of the secondary vein 8 is therefore high, and the space available for the attachment of the upstream suspension system 12 to the turbomachine 1 is radially limited.

The invention makes it possible to ensure the attachment of the upstream suspension system 12 in a zone with reduced radial dimensions.

For this purpose, as can be better seen in FIGS. 2 to 5, said upstream suspension system 12 has an upstream beam 16 attached to the aircraft pylon 11, for example by screwing or bolting.

The beam 16 has a downstream part 16a, extending circumferentially, with three radially inwardly facing devises 17, 18, in particular two side devises 17, which are circumferentially spaced from one another and arranged symmetrically with respect to a central axial plane P passing through the axis of the turbomachine, and a central clevis 18 located at the central axial plane P. The devises 17, 18 can come integrally with the beam 16 or they can be formed by one or more separate parts attached to the beam 16.

The side devises 17 are orientated in such a way as to allow an articulation along an axis parallel to the X axis of the turbomachine. The central clevis 18 is oriented so as to allow an articulation along an axis perpendicular to the X axis of the turbomachine.

The beam 16 also has an upstream part 16b for the articulation of a rudder bar 18. The rudder bar 18 extends circumferentially and has a central zone and two circumferential ends. The central zone is articulated on the upstream part 16a of the beam 16, about an articulation axis located in the above-mentioned central axial plane P and inclined at an angle of between 30 and 60°, for example of the order of 45° to the radial plane.

The upstream assembly 12 also comprises two force-recovery rods 19, circumferentially spaced from each other and located symmetrically on either side of the axial central plane P.

Each force-recovery rod 19 comprises a first end, radially external and downstream, comprising a clevis 19a, articulated on a circumferential end of the rudder bar 18, and a second end, radially internal and upstream, comprising a clevis 19b, articulated on a fixed part of the turbomachine. The fixed part of the turbo-machine on which the force-recovery rods 19 are articulated can be the intermediate casing 9.

The first ends 19a of the force-recovery rods 19 are articulated on the rudder bar 18 about axes parallel to the articulation axis of rudder bar 18 on beam 16.

In the embodiment shown in FIG. 1, the second ends 19b of the force-recovery rods 19 are articulated to the intermediate casing 9, and more particularly to a rigid flange 9' of the intermediate casing located in the inter-vein compartment. The hinges of the force-recovery rods 19 on the intermediate casing 9 are located axially in an area of the intermediate casing within which a downstream part of the reducer 30 is located. More precisely, these articulations are located in a radial plane traversed by a downstream part of the reducer 30.

Each connecting rod 19 extends along an axis inclined with respect to the central axial plane P. The force-recovery rods 19 extend circumferentially apart from each other in an upstream direction.

In addition, the upstream assembly 12 has a mounting plate 20 extending circumferentially over an angular sector, attached to the inter-compressor casing 14. The mounting plate 20 has two side devises 21, symmetrically located on either side of the central axial plane P, and a central clevis 22, located at the central axial plane P.

The side devises 21 are oriented to allow an articulation along an axis parallel to the X-axis of the turbomachine 1. The central clevis 22 is oriented so as to allow an articulation along an axis perpendicular to the X axis of the turbomachine 1.

A first and a second connecting rod 23, 23' connect the corresponding side devises 17, 21 of the beam 16 and the mounting plate 20. In addition, in order to promote the secondary flow rate, it can be useful to reduce the width of the pylon at the downstream suspension system 13 of the turbomachine. To achieve this, it is advantageous for the downstream suspension to be designed relatively narrow by not incorporating a system for taking up the torque forces Mx which are exerted on the turbomachine in a circumferential direction around the X axis. Torque take-up can then be carried out at the upstream suspension system 12. In a manner known per se, one of the connecting rods 23, 23', e.g. the second connecting rod 23' shown schematically in FIG. 2, can have an L-shape, also known as a "boomerang". The second connecting rod 23' then has two pins for connecting to the beam, so that torque can be taken up.

A third connecting rod 24 connects the central clevis 18 of beam 16 and the central clevis 22 of the mounting plate 20.

The first and second connecting rods 23 extend in a radial plane and each comprises a first, radially outer end, articulated on the corresponding side clevis 17 of the beam 16 about an axis of articulation parallel to the axis X of the turbomachine 1, and a second, radially inner end, articulated on the corresponding side clevis 21 of the fixing plate 20, about an axis of articulation parallel to the axis X of the turbomachine 1.

The first and second connecting rods 23 move away from each other circumferentially, radially inward.

Figure 2:
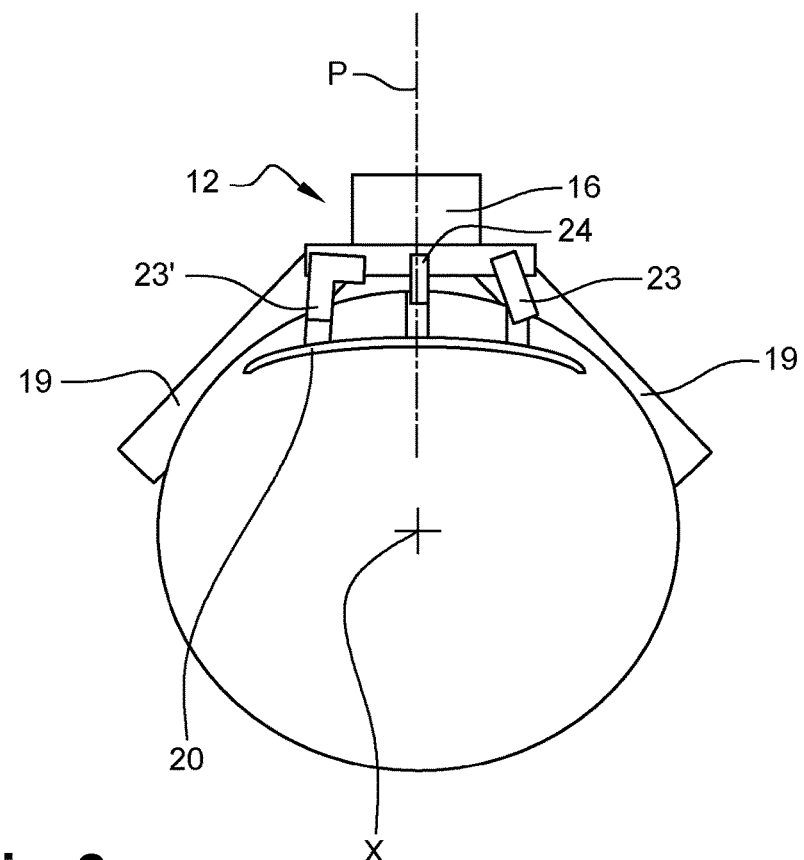
FIG. 2 is a schematic view, radial section of the turbomachine, illustrating the upstream suspension system of the means of suspension.

One of the connecting rods 23 can have a general L-shape with two parts at an angle to each other, as shown in FIG. 2

The third connecting rod 24 extends in the axial central plane P along an axis inclined to the radial plane R.

The third connecting rod 24 comprises a first end, articulated on the central clevis 18 of the beam 16, about an axis of articulation perpendicular to the axis X of the turbomachine 1, and a second end, articulated on the central clevis 22 of the mounting plate 20, about an axis of articulation perpendicular to the axis X of the turbomachine 1. Said first, radially outer end is located downstream of said second, radially inner end of the third connecting rod 24.

The first and second connecting rods 23 are capable of taking up radially directed forces and torque around the X axis of the turbomachine 1, the third connecting rod 24 acting as a fail-safe force-recovery function in the event that one of the connecting rods 23 is not capable of taking up the corresponding forces or torque.

The downstream suspension system 13 comprises two connecting rods 25 (FIG. 1) spaced circumferentially apart and capable of taking up radially directed forces.

The connecting rods 25 of the downstream assembly 13 extend in a radial plane, the axes of articulation of said connecting rods 25 being parallel to the X axis of the turbomachine 1.

Each connecting rod 25 of the downstream assembly can be articulated, at a first end, on a downstream suspension beam 26, attached to the pylon 11, and at a second end, on the exhaust casing 15 of the turbomachine.

The invention claimed is:

1. Turbomachine extending along an axis, comprising a high-pressure body with a high-pressure compressor coupled in rotation to a high-pressure turbine, and a low-pressure body including a low-pressure compressor coupled in rotation to a low-pressure turbine, an upstream casing located upstream of the high-pressure compressor, and means of suspension for the turbomachine, intended for attaching the turbomachine to an aircraft pylon, the said means of suspension comprising an upstream suspension system with a beam intended to be attached to the pylon, at least two connecting rods spaced apart circumferentially from each other and each articulated at a first end to the beam and at a second end to the upstream casing, a rudder bar articulated on the beam at the level of a circumferentially central zone of said rudder bar, at least two force-recovery rods to take up the thrust forces of the turbomachine, spaced apart circumferentially from each other and each articulated at a first end on the rudder bar and at a second end on a fixed part of the turbomachine, the said at least two force-recovery rods being located upstream of a radial suspension plane defined by the two connecting rods, the means of suspension also comprising a downstream suspension system capable of connecting the pylon to a fixed downstream casing of the turbomachine.

2. Turbomachine according to claim 1, characterised in that the upstream casing is an inter-compressor casing, located axially between the high-pressure compressor and the low-pressure compressor.

3. Turbomachine according to claim 1, characterised in that a first connecting rod and a second connecting rod of said connecting rods extend in a radial plane of the turbomachine, the first end and the second end of each of the first and second connecting rods being articulated about articulation axes parallel to the axis of the turbomachine.

4. Turbomachine according to claim 2, characterised in that a first connecting rod and a second connecting rod of said connecting rods extend in a radial plane of the turbomachine, the first end and the second end of each of the first and second connecting rods being articulated about articulation axes parallel to the axis of the turbomachine.

5. Turbomachine according to claim 1, characterised in that the upstream suspension system of the means of suspension comprises a third connecting rod articulated at a first end to the beam and articulated at a second end to the upstream casing, a functional clearance being provided on at least one articulation of the third connecting rod to the beam and/or to the upstream casing in such a way that the third connecting rod is not solicited during normal operation and is solicited in the event of rupture of one of the first and second connecting rods.

6. Turbomachine according to claim 2, characterised in that the upstream suspension system of the means of suspension comprises a third connecting rod articulated at a first end to the beam and articulated at a second end to the upstream casing, a functional clearance being provided on at least one articulation of the third connecting rod to the beam and/or to the upstream casing in such a way that the third connecting rod is not solicited during normal operation and is solicited in the event of rupture of one of the first and second connecting rods.

7. Turbomachine according to claim 3, characterised in that the upstream suspension system of the means of suspension comprises a third connecting rod articulated at a first end to the beam and articulated at a second end to the upstream casing, a functional clearance being provided on at least one articulation of the third connecting rod to the beam and/or to the upstream casing in such a way that the third connecting rod is not solicited during normal operation and is solicited in the event of rupture of one of the first and second connecting rods.

8. Turbomachine according to claim 5, characterized in that the third connecting rod extends in an axial plane and is articulated at its first end and at its second end about articulation axes perpendicular to the axis of the turbomachine.

9. Turbomachine according to claim 1, characterised in that the second ends of the connecting rods are articulated on a mounting plate attached to the upstream casing.

10. Turbomachine according to claim 2, characterised in that the second ends of the connecting rods are articulated on a mounting plate attached to the upstream casing.

11. Turbomachine according to claim 3, characterised in that the second ends of the connecting rods are articulated on a mounting plate attached to the upstream casing.

12. Turbomachine according to claim 5, characterised in that the second ends of the connecting rods are articulated on a mounting plate attached to the upstream casing.

13. Turbomachine according to claim 8, characterised in that the second ends of the connecting rods are articulated on a mounting plate attached to the upstream casing.

14. Turbomachine according to claim 1, characterised in that the fixed part of the turbomachine is an intermediate casing, and the second end of each force-recovery rod is articulated on a flange of the intermediate casing, the said flange being situated radially between a primary flow vein and a secondary flow vein of the turbomachine.

15. Turbomachine according to claim 2, characterized in that the fixed part of the turbomachine is an intermediate casing, and the second end of each force-recovery rod is articulated on a flange of the intermediate casing, the said flange being situated radially between a primary flow vein and a secondary flow vein of the turbomachine.

16. Turbomachine according to claim 3, characterized in that the fixed part of the turbomachine is an intermediate casing, and the second end of each force-recovery rod is articulated on a flange of the intermediate casing, the said flange being situated radially between a primary flow vein and a secondary flow vein of the turbomachine.

17. Turbomachine according to claim 5, characterized in that the fixed part of the turbomachine is an intermediate casing, and the second end of each force-recovery rod is articulated on a flange of the intermediate casing, the said flange being situated radially between a primary flow vein and a secondary flow vein of the turbomachine.

18. Turbomachine according to claim 1, characterized in that the force-recovery rods extend in a plane forming an angle with the radial plane.

19. Turbomachine according to claim 1, characterised in that one of the connecting rods has an L-shape adapted to take up the torque forces Mx acting on the turbomachine in a circumferential direction about the axis X.

20. Turbomachine according to claim 14, with a reducer for transmission between a shaft of the low-pressure body and a fan located upstream of the intermediate casing, characterized in that the articulations of the force-recovery rods on the intermediate casing are located in a radial plane through which a downstream part of the reducer passes.

* * * * *